(12) United States Patent
Printezis et al.

(10) Patent No.: US 7,779,054 B1
(45) Date of Patent: Aug. 17, 2010

(54) HEURISTIC-BASED RESUMPTION OF FULLY-YOUNG GARBAGE COLLECTION INTERVALS

(75) Inventors: Antonios Printezis, Burlington, MA (US); David L. Detlefs, Westford, MA (US)

(73) Assignee: Oracle America, Inc., Redwood City, CA (US)

( * ) Notice: Subject to any disclaimer, the term of this patent is extended or adjusted under 35 U.S.C. 154(b) by 583 days.

(21) Appl. No.: 11/239,992

(22) Filed: Sep. 30, 2005

(51) Int. Cl.
*G06F 12/00* (2006.01)
*G06F 17/30* (2006.01)
(52) U.S. Cl. ...................... 707/813; 707/819
(58) Field of Classification Search ......... 707/813–820, 707/999.206
See application file for complete search history.

(56) References Cited

U.S. PATENT DOCUMENTS

| | | | | |
|---|---|---|---|---|
| 5,136,706 | A * | 8/1992 | Courts | 707/206 |
| 5,355,483 | A * | 10/1994 | Serlet | 711/154 |
| 5,551,003 | A * | 8/1996 | Mattson et al. | 711/136 |
| 5,652,883 | A * | 7/1997 | Adcock | 707/206 |
| 6,081,665 | A | 6/2000 | Nilsen et al. | |
| 6,470,361 | B1 * | 10/2002 | Alpern et al. | 707/206 |
| 6,526,422 | B1 * | 2/2003 | Flood et al. | 707/206 |
| 6,839,725 | B2 * | 1/2005 | Agesen et al. | 707/206 |
| 6,931,423 | B2 * | 8/2005 | Sexton et al. | 707/205 |
| 7,017,162 | B2 * | 3/2006 | Smith et al. | 719/328 |
| 2004/0039759 | A1 * | 2/2004 | Detlefs et al. | 707/206 |
| 2004/0111445 | A1 | 6/2004 | Garthwaite et al. | |
| 2004/0111718 | A1 | 6/2004 | Detlefs | |
| 2004/0162860 | A1 | 8/2004 | Detlefs | |
| 2004/0162861 | A1 | 8/2004 | Detlefs | |
| 2005/0132374 | A1 | 6/2005 | Flood et al. | |
| 2005/0240943 | A1 * | 10/2005 | Smith et al. | 719/328 |

OTHER PUBLICATIONS

"Combining Region Inference and Garbage Collection", by Hallenberg et al., PLDI '02, Jun. 17-19, 2002, Berlin, Germany.*
Hudson, et al., "Incremental Collection of Mature Objects," 16 pages.
Printezis, et al. "A Generational Mostly-Concurrent Garbage Collector," 1998, 12 pages.

(Continued)

*Primary Examiner*—Jay A Morrison
(74) *Attorney, Agent, or Firm*—Robert C. Kowert; Meyertons, Hood, Kivlin, Kowert & Goetzel, P.C.

(57) ABSTRACT

A method for heuristic-based resumption of fully-young garbage collection intervals comprises allocating memory to objects within one or more regions of a heap partitioned into a plurality of regions, and classifying each heap region as belonging to a category of a plurality of categories based at least in part on the recency of allocation of objects within the regions. The method may further comprise determining, using a garbage collection efficiency metric, whether regions belonging to a first category of the plurality of categories are to be excluded from a collection set of a particular garbage collection interval on the heap. In response to determining that the first category of regions is to be excluded, the method may comprise selecting a collection set that does not include any regions of the first category, and reclaiming memory from that collection set.

20 Claims, 9 Drawing Sheets

OTHER PUBLICATIONS

Lieberman, et al., "A Real-Time Garbage Collector Based on the Lifetimes of Objects," Communications of the ACM, Jun. 1983, vol. 26, No. 6, pp. 419-429.

Detlefs, et al., "Garbage-First Garbage Collection," Sun Microsystems, Inc., 2004, pp. 37-48.

Bacon, et al., "The Metronome: A Simpler Approach to Garbage Collection in Real-Time Systems," Springer-Verlag Berlin Heidelberg 2003, pp. 466-478.

Sachindran, et al., "Mark-Copy: Fast Copying GC with Less Space Overhead," ACM, 2003, 18 pages.

* cited by examiner

HEURISTIC-BASED RESUMPTION OF FULLY-YOUNG GARBAGE COLLECTION INTERVALS

BACKGROUND OF THE INVENTION

1. Field of the Invention

The present invention is directed to computer systems. More particularly, it is directed to memory management of computer systems using what has come to be known as "garbage collection."

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, e.g., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "live" or "reachable." (Unreachable space may be termed "garbage", hence the name of the technique.) Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable. As used herein, a call stack is a data structure corresponding to a process or thread (e.g., of an application), whereby the call stack comprises a sequence of frames that store state information, such as register contents and program counter values, associated with nested routines within the process or thread.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage collection mechanisms can be implemented by various parts and levels of a computing system. One approach is simply to provide them as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

While an implementation of automatic garbage collection can greatly reduce the occurrence of memory leaks and other software deficiencies, it can also have significant adverse performance effects if it is not implemented carefully. To distinguish the part of the program that does "useful" work from that which does the garbage collection, the term mutator is sometimes used for the "useful" part; from the collector's point of view, what the mutator does is mutate active data structures' connectivity. The instructions executed by the garbage collector are typically considered memory management overhead, and a variety of garbage collection techniques (such as various types of incremental garbage collection, generational garbage collection, etc.) have been devised to reduce the collection overhead relative to the "useful" work done by the mutator. In general, generational garbage collection refers to techniques where objects in the heap (i.e., the dynamically allocated memory) are segregated into different regions (or "generations"), for example based on how long ago the objects were allocated, and the different regions or generations are managed and collected separately. Generational garbage collection techniques may rely on the general assumption that the age of an object (i.e., how recently the object was originally allocated) affects the probability that the object will remain reachable; e.g., some generational garbage collectors may be configured to concentrate on preferentially collecting regions that contain relatively recently allocated ("young") objects, as recently allocated objects are assumed to become unreachable more quickly than long-lived objects.

Mutator operations may be interleaved with garbage collection operations in a variety of ways—for example, a garbage collector may be periodically or aperiodically activated to perform what is called a garbage collection "cycle" or "interval", during which a portion or all of the heap for a mutator may be examined for unreachable objects, and unreachable objects found may be reclaimed. After the interval completes, the garbage collector may be deactivated until the next interval is triggered, e.g., by a detection that insufficient heap memory remains free, or based on a schedule. The mutator may proceed with its operations concurrently with the garbage collection interval in some implementations, while in other implementations mutator operations may be suspended during at least a part of the garbage collection interval. Periods during which mutators are suspended may be termed "stop-world" pauses, and a garbage collection interval that requires mutators to remain suspended throughout the interval may also be termed a garbage collection "pause". Some garbage collectors (which may be termed incremental collectors) may be configured to collect only a subset of the heap at one time, e.g., in order to reduce the impact of garbage collection on mutator performance. The subset of the heap that is collected during a given garbage collection interval may be termed the "collection set" for that interval. Incremental garbage collection may be combined with generational garbage collection in some algorithms; e.g., the subset of the heap collected during a particular collection interval may correspond to regions of a particular generation or a selected set of generations.

Many modern mutator applications may be characterized by large amounts of live (i.e., reachable) heap data and considerable thread-level parallelism, and may be run on high-end multiprocessor systems to achieve desired performance goals. In addition to throughput-oriented performance goals, certain classes of such applications may also have responsiveness constraints that may be described as "soft real time constraints". For example, telecommunications call-processing applications may require that delays in setting up calls be limited to no more than a specified fraction of a second, or at least that no more than a small percentage of call setups last longer than a specified interval.

When applications with soft real time constraints are executed in an environment employing garbage collection, the garbage collector may also take the real time constraints into account. For example, some systems may allow users to specify soft real-time garbage collection objectives, such as an objective that garbage collection consume no more than "x" milliseconds of any "y" millisecond time slice. In order to attempt to meet such goals, garbage collection may be performed incrementally in such environments, and some portions of the garbage collector actions may be performed concurrently with mutator actions. In view of known trends in memory usage common to many types of applications, where the majority of unreachable objects in a heap tend to be recently allocated objects, generational and incremental garbage collection techniques may be combined for use with some applications with responsiveness constraints. For example, a garbage collector may be configured to classify heap regions into "young" regions (which may include the most recently allocated objects) and "non-young" regions, and select only a subset of the heap regions for collection during a given collection interval. Such a collector may, in general, identify and reclaim unreachable objects from young regions in preference to non-young regions, and may also reduce the overall overhead of garbage collection by maintaining different sets of garbage collection-related data structures for young regions and non-young regions (e.g., less information about cross-region references may be maintained for young regions). However, as more and more objects are allocated and modified by the mutating application, eventually, one or more non-young regions may have to be collected as well. Choices such as whether to include only young regions or both young and non-young regions in a collection set, and when to switch between collection sets that include non-young regions and collection sets that include only young regions, may have to be made carefully, taking the potential impact of the choices on application responsiveness into account.

SUMMARY

Various embodiments of methods and systems for heuristic-based resumption of fully-young garbage collection intervals are disclosed. According to one embodiment, a method comprises allocating memory to objects within one or more regions of a heap partitioned into a plurality of regions, and classifying each heap region as belonging to a category of a plurality of categories, where the categories are based at least in part on the recency of allocation of objects within the regions. For example, in one embodiment, the regions with allocated objects may be classified as either "young" regions (generally containing the most recently allocated objects) or "non-young" regions. The method may further comprise determining, using a garbage collection efficiency metric, whether regions belonging to a first category (e.g., non-young regions) are to be excluded from a collection set of a particular garbage collection interval on the heap. In response to determining that the first category of regions is to be excluded, the method may comprise selecting a collection set that does not include any regions of the first category, and reclaiming memory from that collection set. The garbage collection efficiency metric may be used for a subset of collection set selections in some embodiments: e.g., in one embodiment, the metric may be used only if the collection set of the immediately previous collection interval included a region belonging to the first category.

A variety of efficiency metrics may be used in different embodiments; for example, the efficiency of a garbage collection interval may be defined as the number of bytes of memory reclaimed in the interval, divided by the time taken to complete the interval. In one embodiment where regions are classified as young or non-young, the efficiency of the most recent collection interval that included a non-young region may be compared to the average efficiency of a set of recent collection intervals whose collection sets included only young regions. If the efficiency of the most recent collection interval that included a non-young region is lower than the average efficiency of the young-only collections, non-young regions may be excluded from the next collection set—that is, the next collection set may comprise only young regions, which may reasonably be expected to result in more efficient garbage collection than if non-young regions were included.

In some embodiments, in determining whether to exclude first category regions from a collection set, the method may utilize a heuristic derived from both an efficiency metric and an estimate of a fraction of the heap that comprises unreachable objects (i.e., "garbage"). The estimate of the fraction of the heap that comprises garbage may be used to compute an adjustment factor to be applied to the efficiency metric, where the application of the adjustment factor results in an increased likelihood of first category regions (e.g., non-young regions) being included in the collection set if the fraction of garbage is relatively high.

Figure 1:
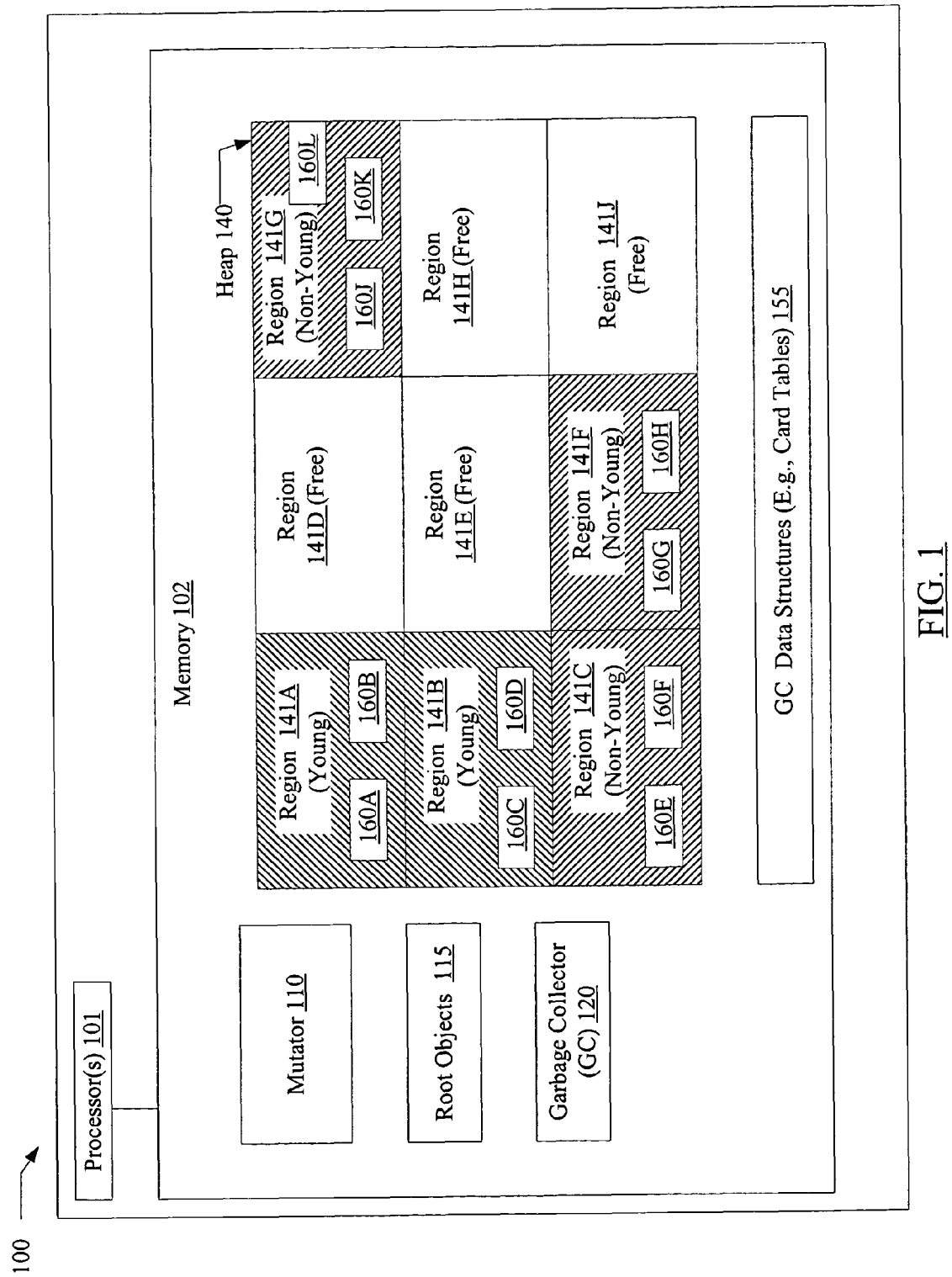
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes one or more processors 101 and a memory 102. Memory 102 may include a mutator 110, a heap 140 representing memory that is dynamically allocated to the mutator, and a garbage collector 120 configured to reclaim memory corresponding to unreachable objects within heap 140. At any given point of time, processors 101 may be executing one or more threads of mutator 110 and/or garbage collector 120. Mutator 110 may represent any application process or thread that modifies dynamically allocated memory. A mutator application may also comprise a plurality of concurrently executing threads in some embodiments, e.g., on a multiprocessor system with a plurality of processors 101. An execution service (such as one or more compilers and/or interpreters, some of which may be incorporated within a virtual machine process in some embodiments) may be responsible for allowing the execution on processors 101 of the application code corresponding to the mutator. While only a single mutator 110 and its corresponding heap 140 is illustrated in FIG. 1, in general memory 102 may comprise numerous mutators 110, each of which may be associated with a corresponding heap 140—i.e., while multiple threads of the same mutator application 110 may access the same heap, each different mutator application may typically access a different heap. In addition, each mutator 110 may also access and modify a corresponding set of root objects 115 (including, for example, statically allocated regions of memory, global variables, etc.). In some embodiments, heap memory may also be allocated for mutator 110 by garbage collector 120, while in other embodiments memory 102 may also include a separate memory allocator (e.g., as part of a memory manager that also includes garbage collector 120 as a component). Garbage collector 120 may be configured to use a variety of data structures 155 (e.g., "card table" data structures as described below), also stored within memory 102, when performing garbage collection operations.

In some embodiments, mutator 110 may comprise an application with real-time or responsiveness constraints, such as a telecommunications call processing application that may require that delays in setting up telephone calls be limited to no more than a specified fraction of a second, or at least that no more than a small percentage of call setups last longer than a specified interval. The application-level responsiveness constraints may be translated (e.g., either automatically by the application, or explicitly by an administrator or some other authorized user) into specific garbage collection performance goals, such as a goal that garbage collection consume no more than "x" milliseconds out of any "y" millisecond time slice of execution on processors 101. In such embodiments, garbage collector 120 may be configured to attempt to achieve the garbage collection performance goals using a variety of techniques in various embodiments. For example, garbage collector 120 may be configured to predict or estimate the time it may take to collect garbage from various regions of the heap as well as the time it may take to perform various other garbage collection operations such as the marking of reachable objects, to select collection sets and schedule collection intervals on the basis of these predictions and the specified soft real-time goals, to keep track of the extent to which the goals are being met and to adapt accordingly (e.g., by changing schedules, adjusting collection set selection, etc.), and so on. Various aspects of the operation of a garbage collector 120 configured to support soft real-time constraints (e.g., operations performed during collection set selection) are described below in further detail.

In one embodiment, garbage collector 120 may be configured to partition the heap 140 into a set of heap regions 141, such as regions 141A-141J of FIG. 1. Each of the regions 141 comprises a contiguous range of virtual memory; in some embodiments each region 141 may be equal in size to each of the other regions, while in other embodiments, the sizes of different regions may vary. At a given point in time, one or more regions 141 (such as regions 141D, 141E, 141H and 141J in FIG. 1) may be "free", i.e., they may contain no currently allocated objects, while other regions (such as regions 141A, 141B, 141C, 141F and 141G) may include objects 160 (e.g., objects 160A and 160B in region 141A, objects 160C and 160D in region 141B, objects 160E and 160F in region 141C, etc.) for which heap memory is currently allocated on behalf of mutator 110. Garbage collector 120 may be configured to incrementally reclaim heap memory; that is, the collector may be configured to select one or more of heap regions 141 from which unreachable memory is to be reclaimed during a given garbage collection interval, instead of collecting garbage from the entire heap during each interval. It is noted that the terms "garbage collection intervals", "collection intervals", "collection pauses", and "evacuation pauses" may be used synonymously herein. In one embodiment, for example, one or more threads of mutator 110 may execute for "a" milliseconds; then, the mutator threads may be paused for a garbage collection interval of "b" milliseconds, during which unreachable objects 160 from one or more regions 141 may be reclaimed. After the garbage collection interval of "b" milliseconds, the mutator threads may resume execution, e.g., for "c" milliseconds, only to be paused again for the next garbage collection interval of "d" milliseconds, and so on. One or more threads of garbage collector 120 (such as a thread configured to implement part or all of a marking cycle) may be concurrently active during periods when the mutator 110 is executing in some embodiments. The specific set of regions 141 from which memory is reclaimed during a particular collection interval may be referred to herein as the "collection set" for that collection interval. In some embodiments, once a collection interval for a particular collection set is initiated, garbage collector 120 may be configured to complete collecting the entire collection set before allowing mutator 110 to resume; e.g., garbage collection operations may not be paused until the collection interval completes in such embodiments. In other embodiments, garbage collector 120 may be configured to stop collecting before all the regions 141 of a collection set are fully collected (or even while a particular region 141 is in the process of being collected) if a particular type of high-priority request or interrupt is received.

Garbage collector 120 may be configured to classify heap regions 141 into a plurality of categories based at least in part on the recency of allocation of objects within the regions in some embodiments; that is, garbage collector 120 may be configured to employ a form of generational garbage collection. In the heap 140 shown in FIG. 1, regions 141A and 141B are categorized as "young" regions, and regions 141C, 141F and 141G are categorized as "non-young" regions, indicating, for example, that objects 160A-160D were allocated more recently than objects 160E-160H and 160J-160L. In one embodiment, a region 141 that contains allocated objects but does not contain any objects 160 that were allocated prior to the immediately previous collection interval may be designated as a "young" region, and a region that contains at least one object that was originally allocated prior to the immediately previous collection interval may be designated as a "non-young" region. In such an embodiment, all currently existing young regions may be included within the collection set for each collection cycle. For example, if a collection interval is scheduled to be performed at time T1, and regions 141A and 141B are categorized as "young" regions at time T1, regions 141A and 141B may be included in the collection set for the collection interval performed at time T1. During the collection interval, one or both of the young regions 141A and 141B of the collection set may be collected (e.g., garbage objects from these regions may be freed and any live objects from these regions may be evacuated or copied to other regions) and designated as free regions. During the next period of mutator activity, another region, such as 141D, may be used to allocate new objects 160 and may be designated as a young region. When the next collection interval occurs, e.g., at time T2, the regions designated as young at time T2 (e.g., region 141D) may be included in the corresponding collection set. Categorizing regions 141 in this manner and including all existing young regions in collection sets for each collection interval may allow garbage collector 120 to take advantage of several common assumptions on the behavior of heap objects—for example, newly allocated objects are usually more likely to become garbage sooner than older objects, and newly allocated objects are also more likely to be targets of pointer modifications. Further details on how garbage collection overhead related to pointer modification may be reduced for young regions in some embodiments are provided below in conjunction with the description of FIG. 2*a*-FIG. 2*e* and the corresponding discussion of remembered set maintenance.

As more and more objects are allocated and modified by the mutating applications, however, one or more non-young regions may eventually have to be collected as well; that is, a collection set for a particular collection interval may have to include a non-young region. Collection sets that include non-young regions may be termed "partially-young (PY)" collection sets herein, and the corresponding collection intervals may be termed "partially-young" collection intervals. Collection sets and intervals that include only young regions may similarly be referred to herein as "fully-young (FY)". Thus, as described below in further detail in conjunction with the description of FIG. 3, a sequence of one or more FY collection intervals may eventually have to be followed by a sequence of one or more PY collection intervals.

The decision on whether a non-young region should be collected, and the order in which non-young regions should be collected, may be made based on a variety of criteria in different embodiments. In some embodiments, for example, such decisions may be made in conjunction with a completion of a "marking cycle" comprising a global analysis of reachability of objects in the heap. In one embodiment, garbage collector 120 may be configured to initiate a marking cycle when the heap reaches a specified occupancy level. The "high occupancy level" may be defined as a tunable parameter (e.g., a parameter that indicates that a marking cycle should be initiated when 60% of the heap regions are not free). A high heap occupancy level may serve as an indication that one or more non-young regions should soon be considered for collection, e.g., in order to prevent the heap from running out of space entirely. During the marking cycle (portions or all of which may be concurrently executed with mutator operations), unreachable objects within non-young regions may be identified. The amount of "live" or reachable memory within each region may also be computed during the marking cycle in some embodiments; thus, the marking cycle may provide a measure of how much of the heap is live, and how much of the heap is garbage. (Such a measure of the fraction of the heap that is garbage may be used as an adjustment factor in a heuristic used to select collection sets in some embodiments, as described below in further detail in conjunction with the description of FIG. 5.) At the end of a marking cycle, in one embodiment garbage collector 120 may be configured to determine an order in which the non-young regions of the heap should preferably be collected: e.g., in one implementation, non-young regions may be ranked in order of estimated garbage collection efficiency (GCE). A number of different definitions of garbage collection efficiency may be employed in various embodiments: e.g., in one embodiment, the estimated GCE for a region may be defined as the number of bytes of that region that are estimated to be reclaimed in a collection interval, divided by the time estimated to reclaim the bytes. One or more PY collection intervals that follow the marking cycle may include the most preferred non-young regions (as well as all available young regions) in their collection sets; that is, non-young regions may be included in collection sets in the order of preference identified by the garbage collector.

As non-young regions are collected during one or more PY collection intervals following a marking cycle, garbage collector 120 may be configured to make a determination, for a given collection interval to be scheduled next, whether to continue collecting non-young regions, or to exclude non-young regions from the collection set of the given collection interval. That is, garbage collector 120 may have to determine when or not to transition from PY collection intervals back to FY collection intervals. In one embodiment, where the non-young regions are collected in an order of preference or efficiency, the advantages of collecting the remaining non-young regions may no longer be outweighed by the costs after the most preferred non-young regions have already been collected, especially in view of the soft real-time constraints imposed on garbage collector 120. In determining whether to exclude non-young regions from a collection set after one or more collection intervals during which non-young regions are collected, in one embodiment, garbage collector 120 may be configured to use a heuristic that is based (at least in part) on metrics of garbage collection efficiency (GCE) of one or more collection intervals performed on the heap. A GCE metric for a completed collection interval may be computed, for example, as the actual number of bytes collected during the interval, divided by the time taken to complete the interval. (As noted above, GCE considerations may also be used to initially rank non-young regions in order of collection preference in some embodiments.) In one implementation, garbage collector 120 may be configured to retain GCE metrics for a number of recently performed collection intervals, and to transition from a sequence of PY collection intervals to an FY collection interval if the GCE metric of the most recent PY interval falls below a threshold value. The threshold value may, for example, be an average of the GCE metrics of a specified number of recent FY intervals. In another implementation, garbage collector 120 may be configured to estimate GCE for a potential next PY collection interval, and may decide to instead perform a FY collection interval if the estimated GCE is below a threshold value. As described below in further detail, additional factors, such as a measure of the fraction of heap 140 that consists of unreachable objects, which may have been computed during the marking cycle, may also be used in the heuristic in some embodiments. A specific example of a heuristic that employs GCEs and an additional adjustment factor in deciding whether to resume FY collections after one or more PY collections is described below in further detail in conjunction with the description of FIG. 5.

The sequence of PY collection intervals may eventually be succeeded by one or more FY collection intervals, either because of a heuristic-based decision as described above, or because all collectible non-young regions have been collected. (It is noted that, at least in principle, in some implementations it is possible that once a sequence of PY collection intervals begins, all succeeding intervals during the execution of mutator 110 may be PY intervals; however, in general and especially for long-lived mutator applications, the probability of FY collection intervals eventually being resumed after a sequence of PY intervals is expected to be high.) The FY collection intervals may again be followed by PY collection intervals (e.g., after the next marking cycle), and the alternation of FY and PY collection interval sequences may continue.

Typically, when a free region 141 is selected to allocate memory for mutator objects 160, garbage collector 120 may change the designation of the region from "free" to "young" in some embodiments. A region 141 may be designated as "non-young" if, for example, one or more reachable objects are evacuated or copied to the region during a collection interval. In some embodiments, once a region is designated as young or non-young, the designation may not be modified, at least until the next collection interval. It is noted that in some embodiments, under some circumstances, a free region that has been selected to store newly allocated objects may not necessarily be designated as young; instead, based for example on a heuristic derived from a global state of the heap, garbage collector 120 may classify such a region as non-young even if it does not currently contain any objects that were originally allocated prior to the previous collection interval. It is noted that definitions other that those provided above for "young" and "non-young" regions may be used in various embodiments. In some embodiments, non-free heap regions may be classified into more than two categories: e.g., instead of identifying a region as being either young or non-young, a region may be classified as belonging to a category "A", "B" or C", where objects in "A" regions are younger than objects in "B" regions, and objects in "B" regions are younger than objects in "C" regions, etc.

Figure 2A:
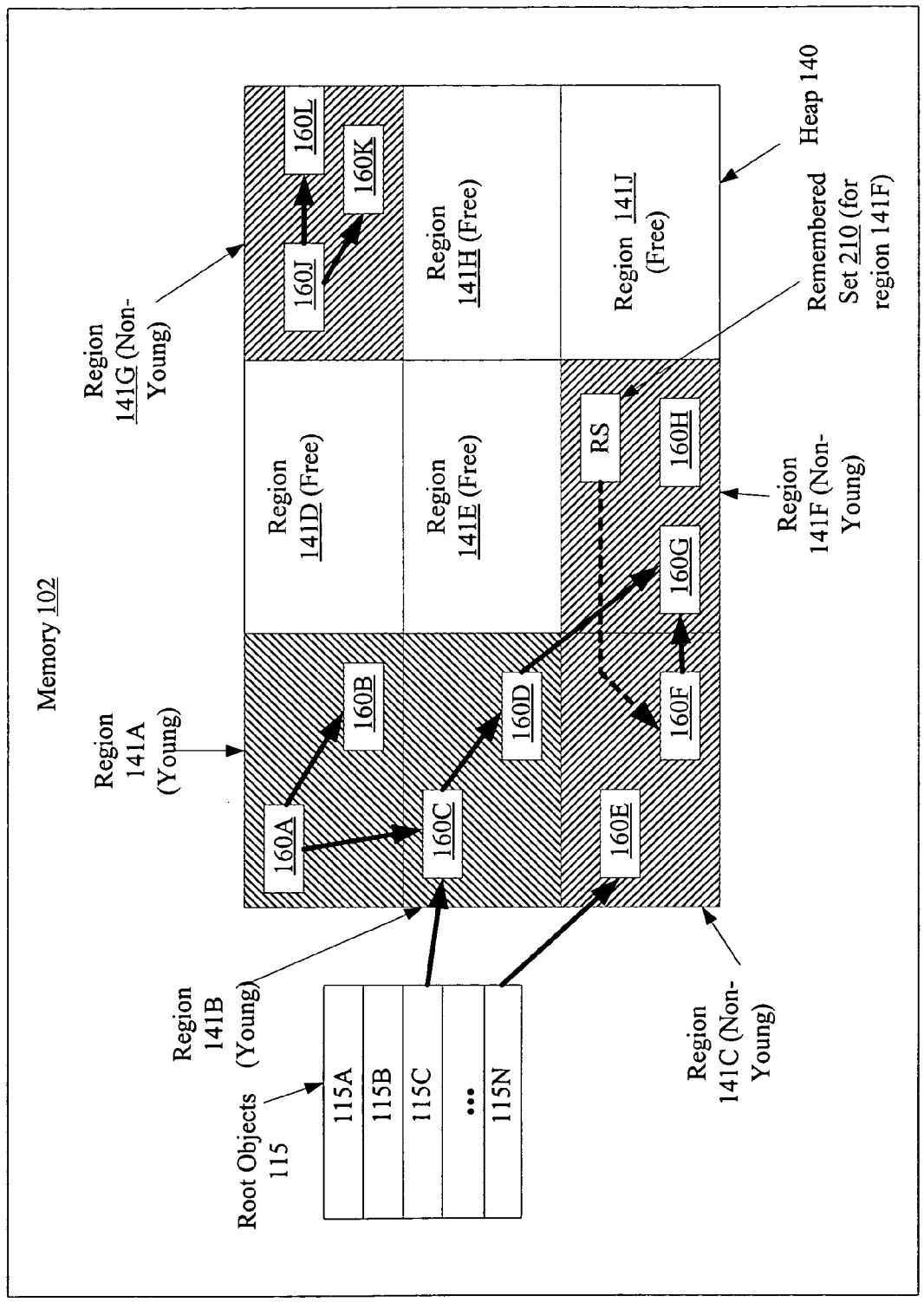
FIG. 2*a*—FIG. 2*e* are block diagrams illustrating aspects of the operation of a garbage collector during a time period that includes two garbage collection intervals, according to one embodiment.

Garbage collector 120 may be configured to utilize a variety of data structures to support garbage collection, such as remembered sets and card tables, in various embodiments. FIG. 2a-FIG. 2e are block diagrams illustrating aspects of the operation of garbage collector 120 during a time period that includes two garbage collection intervals, according to one embodiment in which the garbage collector is configured to maintain remembered sets for non-young regions. FIG. 2a illustrates a point of time at which a fully-young garbage collection interval is about to begin. As shown, heap regions 141A and 141B are currently classified as young regions, heap regions 141C, 141F and 141G are currently classified as non-young, and heap regions 141D, 141E, 141H and 141J are currently classified as free. Root objects 115 of mutator 110 include references to several heap objects 160: e.g., root object 115C points to heap object 160C in young region 141B, and root object 115N references heap object 160E in non-young region 141C. References from root objects to heap objects and from one heap object to another are indicated by bold arrows in FIG. 2a-FIG. 2e; for example, the bold arrow from object 160J to object 160L indicates that object 160J includes a reference to object 160L.

Garbage collector 120 may be configured to maintain a respective data structure called a "remembered set" (RS) for each region, which indicates locations in non-young regions distinct from the region that may contain pointers to objects within the region. For example, since object 160F in non-young region 141C points to object 160G in region 141F, remembered set 210 for region 141F identifies the location 160F (as indicated by the bold broken arrow from RS 210 to object 160F). (It is noted that in some embodiments, if no pointers from other heap regions point to a particular region such as region 141G, a remembered set may not be generated for it.) In general, remembered sets may be implemented using a variety of techniques in various garbage collection algorithms to keep track of cross-region references. Remembered sets may be generated for non-young regions (when a pointer in another non-young region points to a location within the non-young region, as in the case of RS 210 in FIG.

2a) and also for young regions (when a location in any non-young region points to an object within the young region—e.g., in the case of RS 211 in FIG. 2e as described below). For example, in one embodiment, garbage collector 120 may be configured to subdivide heap regions 141 into equal-sized regions called "cards" (e.g., with each card representing 512 contiguous bytes of virtual memory). A remembered set (RS) generated for a particular non-young heap region 141 in such an embodiment may comprise a plurality of RS entries, with each entry identifying a particular card in another non-young region that may contain a reference to an object 160 within the particular region. Remembered sets may be used during garbage collection intervals to ensure that live objects (i.e., objects that are still reachable) within heap 140 survive the collection interval. In one embodiment where heap regions are divided into cards, remembered sets may be implemented using a process called "concurrent refinement" and an additional data structure 155 called a "card table" containing a small entry (e.g., one byte) for each card. When mutator 110 stores a cross-region reference within a field of an object in heap 140, a set of additional instructions (which may be termed a "write barrier") may be executed within the mutator. The write barrier may, for example, check whether a card table entry for the card containing the updated field is in an updated or "dirty" state. If the card table entry is not dirty, the card table entry may be marked as dirty and a record of the modification may be logged, e.g., in a thread-local update buffer. When the update buffer eventually fills, the buffer (or a copy of its contents) may be placed on a global queue by a thread of mutator 110. A concurrent refinement thread of garbage collector 120 may be configured to dequeue buffers from the global queue, scan the cards identified in the buffers, and insert cards containing cross-region pointers in the appropriate remembered sets. When a mutator thread is about to enqueue a full update buffer to the global queue, and determines that the global queue is already longer than a pre-defined threshold value, the mutator thread may synchronously perform the refinement that would otherwise be performed by the concurrent refinement thread. (The garbage collector's refinement thread may be referred to as "concurrent" in such embodiments because some or all of the remembered set refinement operations may be performed concurrently with mutator operations and/or with garbage collection intervals.)

While garbage collector 120 may be configured to generate remembered sets for references from a non-young region to any other region, remembered set entries may not be generated for references from one young region to another (such as the reference from object 160A in region 141A to object 160C in region 141B), or for references from a young region to a non-young region (such as the reference from object 160D in young region 141B to object 160G in non-young region 141F) in the embodiment depicted in FIG. 2a-FIG. 2e. Generating and maintaining remembered set entries for references from young regions may be wasteful, since many or all of the referring objects may become unreachable before the next collection interval. Since most updates take place in young objects, and since remembered set processing may form a significant portion of overall garbage collection related processing, avoiding remembered set generation and maintenance for young regions may reduce garbage collection-related processing costs substantially in some embodiments. However, because it avoids generating remembered set entries for references from young regions, garbage collector 120 may have to use some other mechanism to ensure that objects in non-young regions that are pointed to from young regions (such as object 160G in FIG. 2a) do not get prematurely reclaimed (e.g., if region 141F were collected before young regions 141A and 141B). In one embodiment, garbage collector 120 may be configured to ensure that such premature collection does not occur by collecting all available young regions in every collection interval.

Figure 2B:
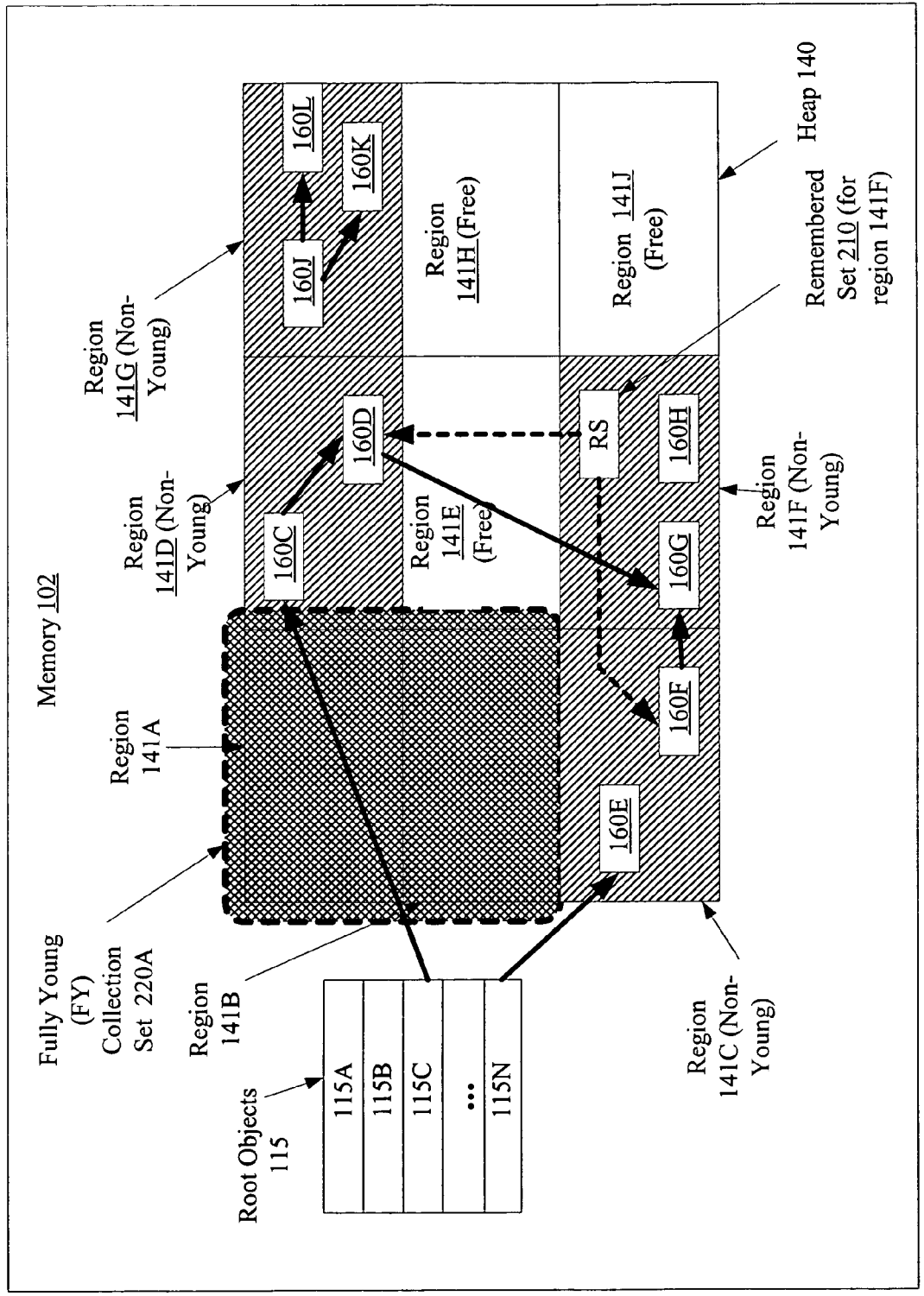

Garbage collector 120 may be configured to perform a fully-young (FY) collection interval on the heap as depicted in FIG. 2a. Thus, the FY collection set for the interval may comprise young regions 141A and 141B, as indicated in FIG. 2b. During the FY collection, objects 160C and 160D (which are referenced directly or indirectly from root object 115C) may be evacuated or copied to region 141D, which may therefore be designated as a non-young region. In addition, because object 160D is now in a non-young region and points to object 160G in non-young region 141F, the remembered set 210 may be updated to include an indication of the reference from object 160D to object 160G, as shown in FIG. 2b by the broken arrow from RS 210 to object 160D.

Figure 2C:
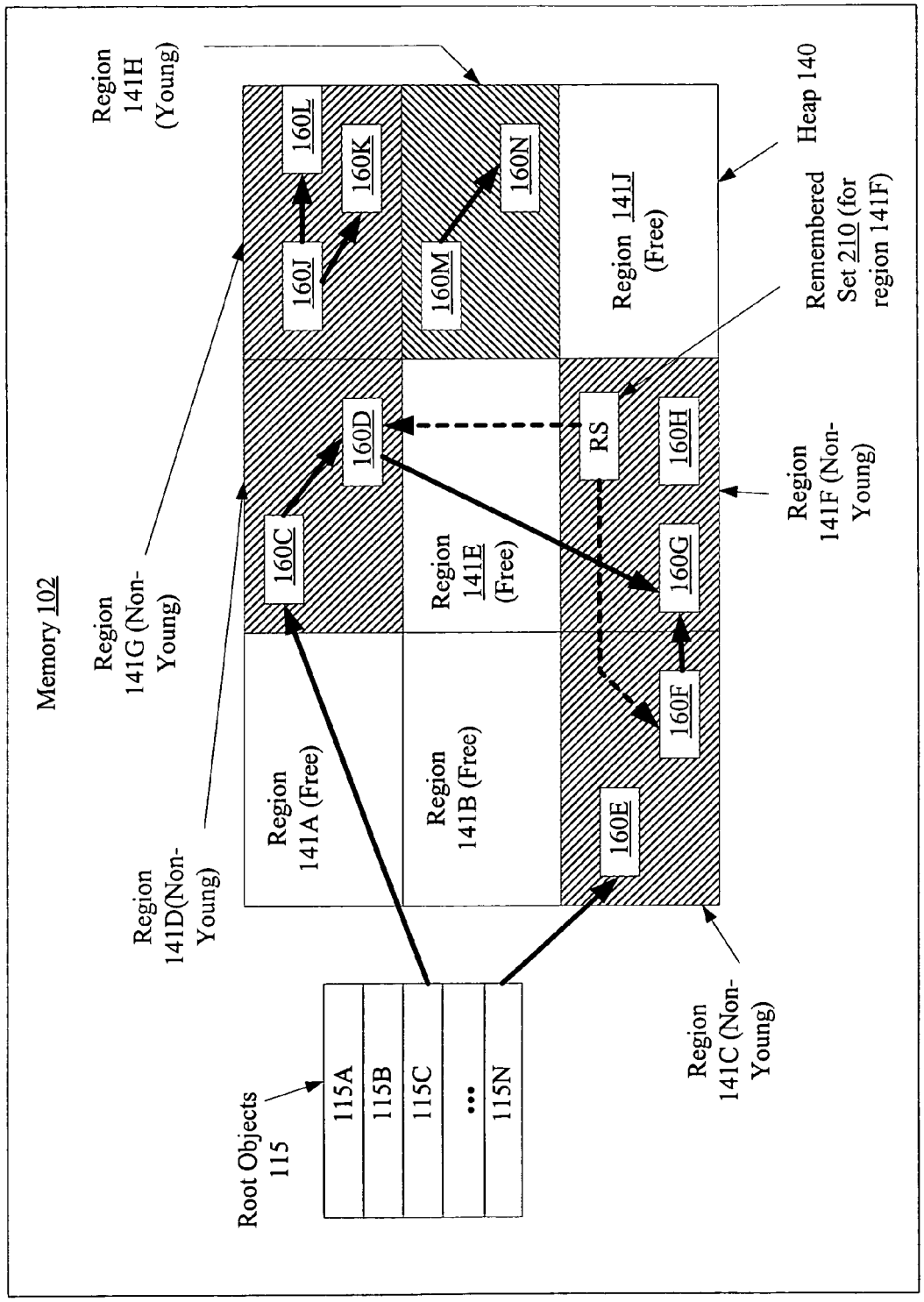
Figure 2D:
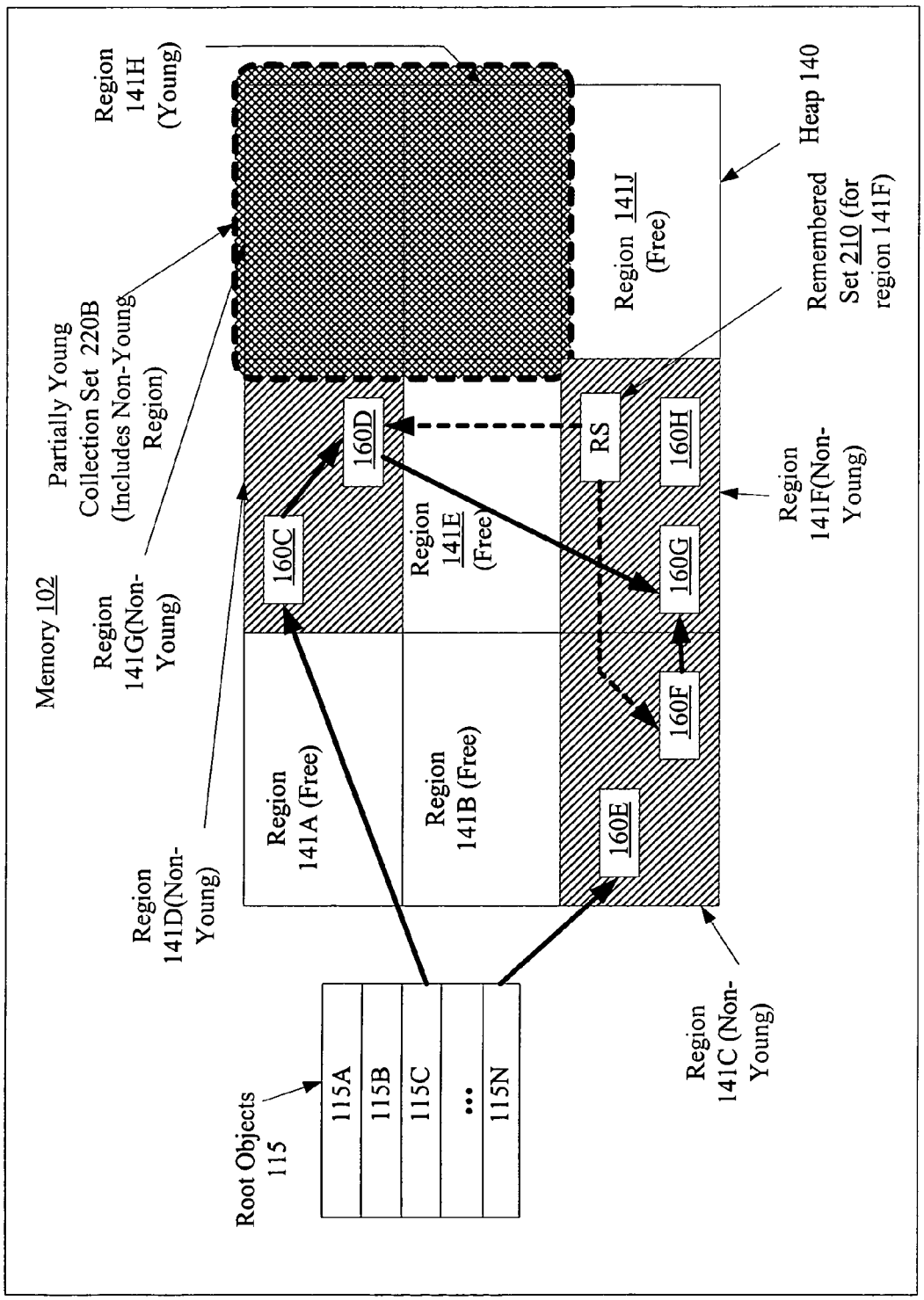

FIG. 2c illustrates the state of the heap at a later point in time than that depicted in FIG. 2b, after additional objects 160M and 160N have been allocated in region 141H (designated as a young region), and after a concurrent marking cycle has been completed by garbage collector 120. At the point in time depicted in FIG. 2c, non-young region 141G has been designated as the non-young region to be collected in preference to any other non-young region (e.g., based on a predicted GCE of the non-young regions). Garbage collector 120 may determine that it should include a non-young region in its next collection set. For example, based on its set of soft real-time constraints, garbage collector 120 may determine that it has 50 milliseconds available for the next collection cycle, that 20 milliseconds may be sufficient to collect the only young region available (141H), and that collection of the most-preferred non-young region 141G may be completed in 25 additional milliseconds (allowing both regions to be collected in 45 milliseconds, which is within the 50 millisecond target). Accordingly, garbage collector 120 may be configured to include both young region 141H and the most-preferred non-young region 141G in the next collection set, as indicated in FIG. 2d, and collect both these regions in the next collection cycle. Thus, in the sequence of heap states illustrated in FIG. 2a-2d, an FY collection interval is followed by a PY collection interval.

Figure 2E:
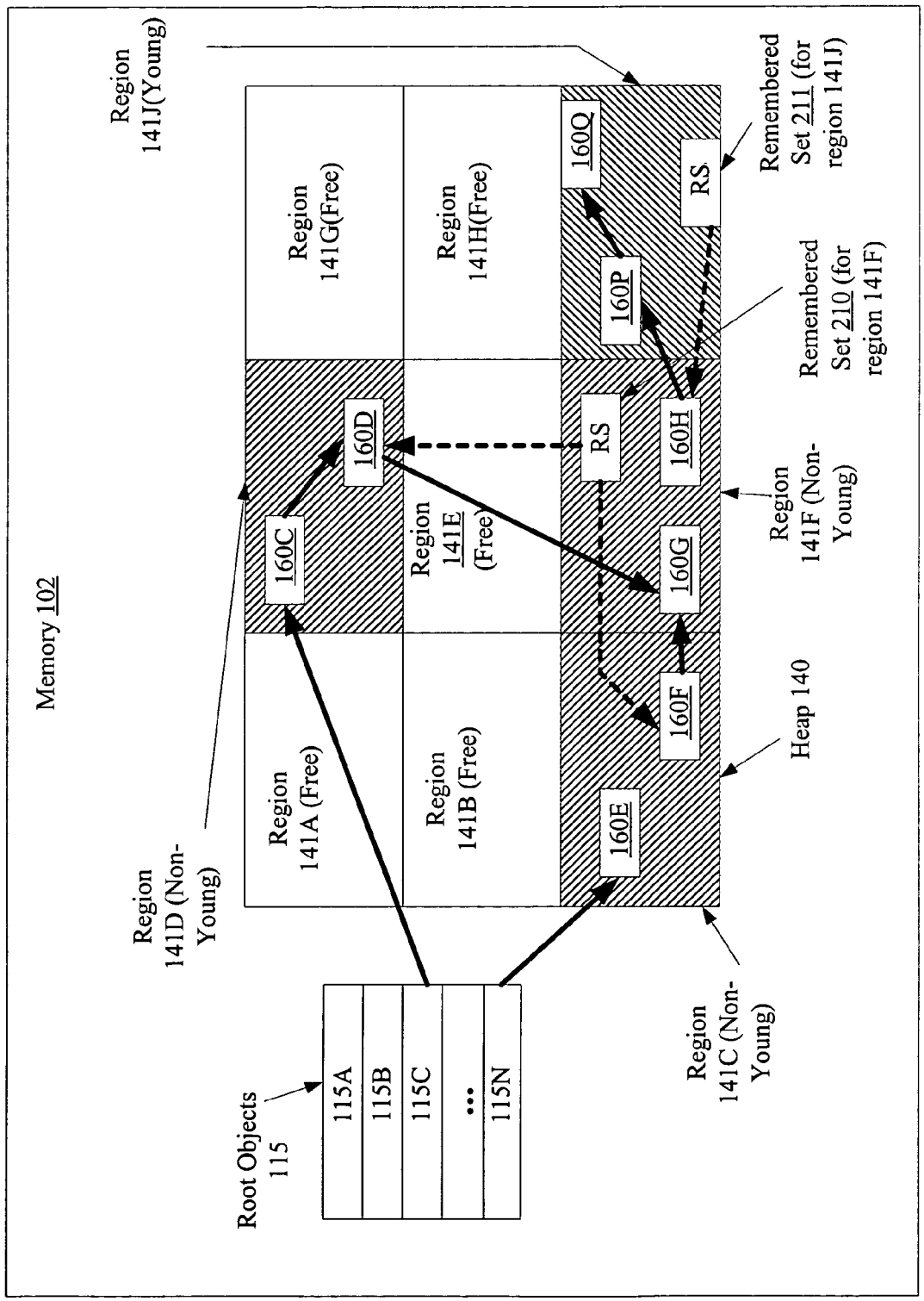

FIG. 2e illustrates a point in time after the PY collection interval of FIG. 2d, at which the immediately next collection interval is to be scheduled. A young region (141J) may be available for collection, as well as several non-young regions (e.g., regions 141C, 141D and 141F) that were not collected earlier because a more preferable non-young region (141G) was available. FIG. 2e includes an example of a remembered set for a young region: remembered set 211 for young region 141J includes a pointer to object 160H in non-young region 160H, because 160H points to object 160P in region 141J. Garbage collector 120 may be configured to determine whether to exclude non-young regions in the next collection set using a GCE-based heuristic as described above. For example, in one implementation garbage collector 120 may have recorded a GCE metric for each of the last five FY collection intervals (e.g., the bytes collected in a given interval, divided by the time taken to complete the interval), as well as a GCE metric for the immediately previous PY collection interval (e.g., the collection interval illustrated in FIG. 2d). In such an implementation, if the recorded GCE metrics indicate that the immediately previous PY collection was less efficient than the average efficiency of the last five FY collections, garbage collector 120 may be configured to determine that non-young regions 141C, 141D and 141F should be excluded from the next collection. Since an estimate of collection efficiency may already have been computed for each of the remaining non-young regions during the process of ranking non-young regions in order of collection preference (which led to the selection of region 141G as the most preferred non-young region), each of the remaining non-young regions may be assumed to have a lower estimated GCE than the last non-young region 141G that was collected. Even if sufficient time were available for collecting one or more of the non-young regions, the estimated efficiency of collecting the remaining non-young regions may be so low that garbage collector 120 may decide to start FY collection, and may allow mutator 110 to resume operation sooner than if a PY collection were performed next.

Figure 3:
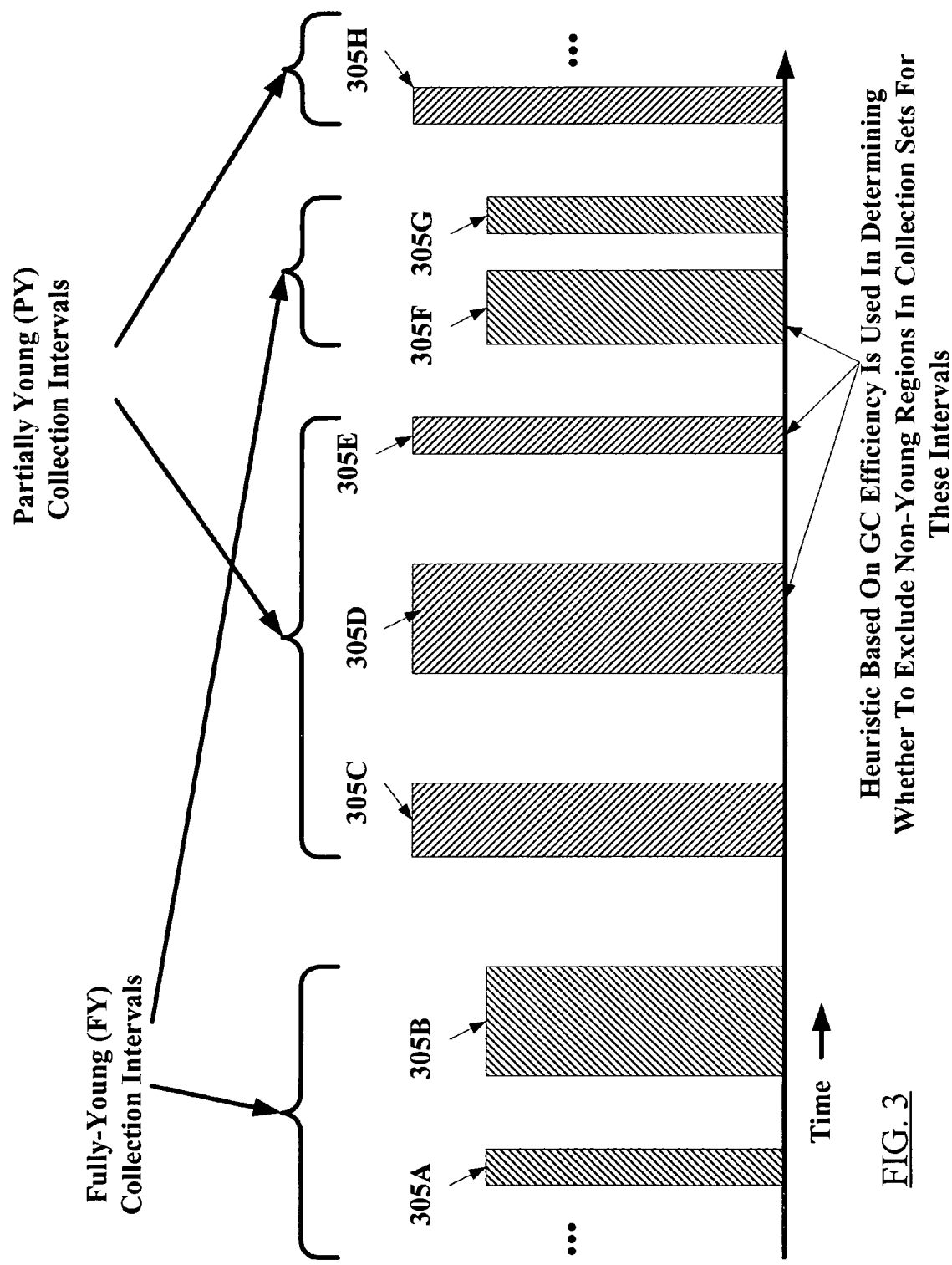
FIG. 3 illustrates a time sequence of collection intervals, according to one embodiment.

FIG. 3 illustrates a time sequence of collection intervals, according to one embodiment. As shown, a sequence of fully young (FY) collection intervals ending in intervals 305A and 305B may be succeeded by a sequence of partially young (PY) collection intervals 305C, 305D and 305E. (It is noted that the different FY and PY intervals are illustrated as blocks of different heights in FIG. 3 merely to distinguish the two types of intervals; the different heights are not intended to indicate a relative quantitative relationship between the FY and PY intervals.) The transition from the FY sequence to the PY sequence may occur, for example, after a marking cycle which may in turn have been triggered by the heap 140 reaching a predetermined occupancy level (e.g., if the percentage of the heap 140 that is free falls below a threshold value). The marking cycle may comprise one or more threads that may execute concurrently with the mutator 110, and may mark the transitive closure of heap objects reachable from the root object set 115. Non-young regions may be ranked in order of estimated GCE at the end of the marking cycle, e.g., based on formulas that estimate the elapsed time for collecting each region and the amount of reclaimable memory in each region. During successive PY collection intervals 305C, 305D and 305E, the remaining highest-ranked non-young region or regions may be collected in order. When determining the collection set for intervals after the initial PY interval 305C (e.g., when choosing regions to be collected during intervals 305D, 305E, and 305F), garbage collector 120 may be configured to use a GCE-based heuristic as described earlier to determine whether non-young regions should be excluded. For collection intervals 305D and 305E, garbage collector 120 may have determined that non-young regions are not be excluded; while for interval 305F, garbage collector 120 may have determined that non-young regions are to be excluded. The PY sequence 305C-305D-305E may be succeeded by an FY sequence 305F-305G, which may in turn be succeeded by another PY sequence beginning with 305H, and the pattern of alternating FY and PY sequences may continue.

Figure 4:
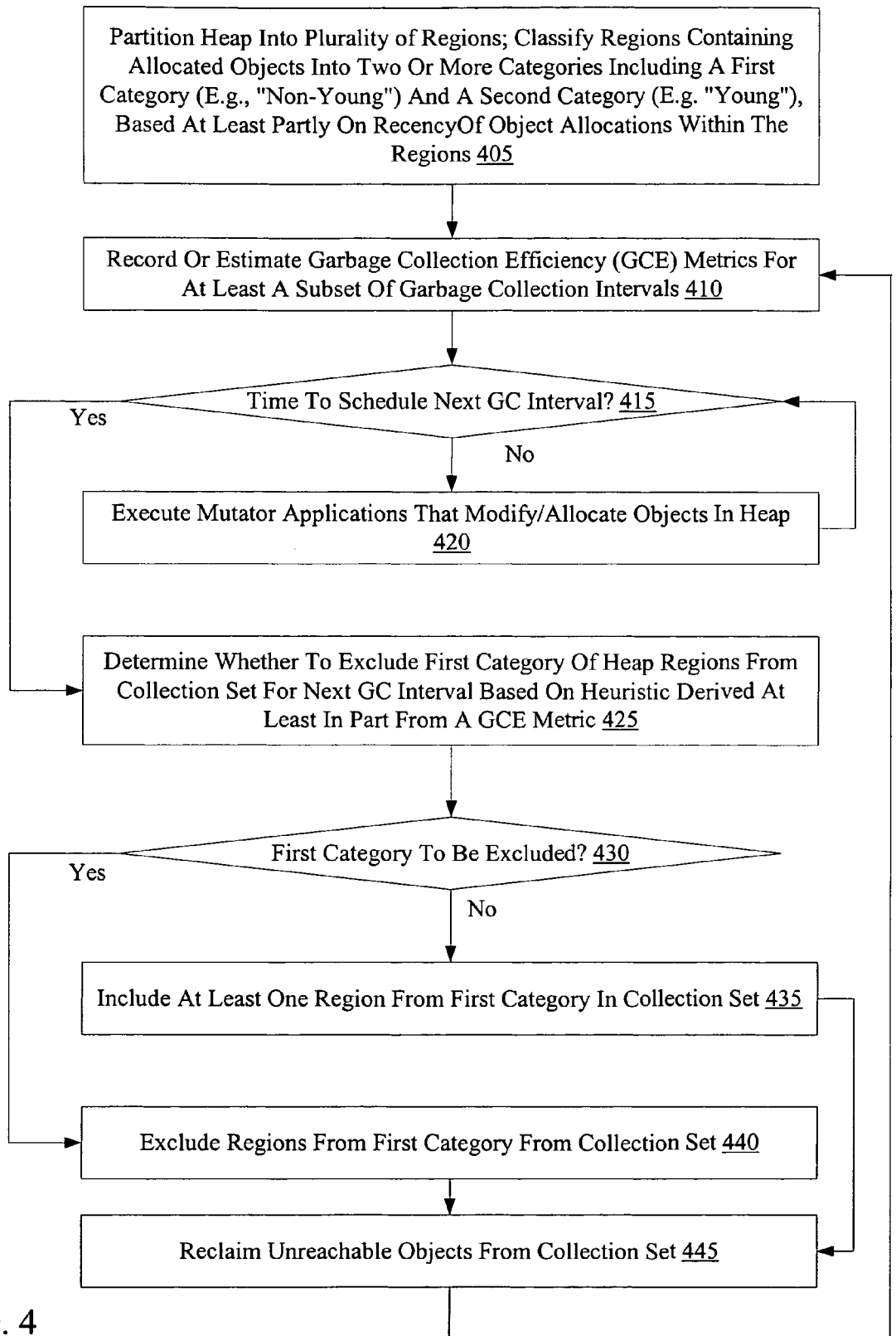
FIG. 4 is a flow diagram illustrating aspects of the operation of a garbage collector configured to use an efficiency-based heuristic to determine whether a collection set is to exclude a particular category of regions, according to one embodiment.

FIG. 4 is a flow diagram illustrating aspects of the operation of a garbage collector 120 configured to use a GCE-based heuristic to determine whether a collection set is to exclude a particular category of regions (e.g., non-young regions), according to one embodiment. The garbage collector 120 may be configured to partition a heap 140 into a plurality of regions 141 (block 405 of FIG. 4). In addition, the garbage collector may be configured to classify heap regions 141 that include allocated objects 160 into two or more categories including a first category (e.g., non-young regions) and a second category (e.g., young regions), based at least in part on the recency of allocations of objects in the regions. The garbage collector may also be configured to record or estimate garbage collection efficiency (GCE) metrics for at least a subset of collection intervals (block 410). For example, in one embodiment a GCE metric may be defined as (bytes collected)/(time taken for collection). The number of collection intervals for which GCE metrics are to be retained by garbage collector 120, and/or the categories of regions for which GCE metrics are to be retained, may be tunable parameters in some embodiments.

When a collection interval is to be scheduled (as determined in decision block 415), the garbage collector may be configured to determine whether heap regions of the first category (e.g., non-young regions) are to be excluded from the collection set of the collection interval using a heuristic derived at least in part from one of the GCE metrics that have been recorded or estimated (block 425). An example of such a heuristic is provided in FIG. 5 for one embodiment. In some embodiments, the determination of whether heap regions of the first category are to be excluded from a collection set may be made using a heuristic at the end of the immediately previous collection interval, instead of being made when the collection interval is to be scheduled. The determination of whether and when a collection interval is to be scheduled may be made based on any combination of a variety of factors in different embodiments. In one embodiment, a collection interval may be scheduled whenever a currently in-use region 141 becomes full and a new region has to be selected for further allocations. In other embodiments, other factors may be used to schedule a collection interval, such as the time that may have elapsed since the immediately previous collection interval, a collection schedule derived from a set of soft real-time garbage collection performance goals, the current state of the heap 140 as determined by one or more garbage collection threads, an explicit request to initiate garbage collection, etc. Between collection intervals, the mutator 110 may be allowed to continue execution that may result in modifications of existing heap objects 160 and/or allocations of new heap objects 160.

If the garbage collector 120 determines, using the heuristic, that the first category of heap regions 141 is to be excluded from the collection set (as illustrated in decision block 430), the garbage collector 120 may be configured to select a collection set excluding regions belonging to the first category (block 440). If a use of the heuristic results in the determination that garbage collector 120 may include heap regions belonging to the first category, garbage collector 120 may be configured to select a collection set that includes at least one first category region (block 435). In some embodiments, as described earlier, garbage collector 120 may also be configured to rank regions of the first category in order of preference, and select one or more of the first category regions for inclusion in the collection set in accordance with the ranking. The garbage collector may then be configured to perform the collection interval, i.e., to reclaim unreachable objects from the selected collection set (block 445). In some embodiments, a GCE metric for the collection set may be recorded and maintained (block 410) when the collection interval is completed. If a limited number of GCE metrics is being maintained (e.g., if only the GCE metrics for the last ten collection intervals are maintained), one of the maintained GCE metrics may have to be discarded to allow the latest GCE metric to be stored. After the collection interval completes and its GCE metric is stored, the mutator 110 may be allowed to resume operations until the next collection interval is to be scheduled. It is noted that in some embodiments, the heuristic may be used to determine whether a next collection set is to exclude first category regions only if the immediately previous collection set included one or more first category regions. For example, as indicated in the example illustrated in FIG. 3, where the first category corresponds to "non-young" regions, the GCE-based heuristic may be used to determine whether a PY collection interval is to be succeeded by an FY interval or another PY interval, while other criteria may be used to determine whether an FY interval is to be succeeded by an FY interval or a PY interval.

Figure 5:
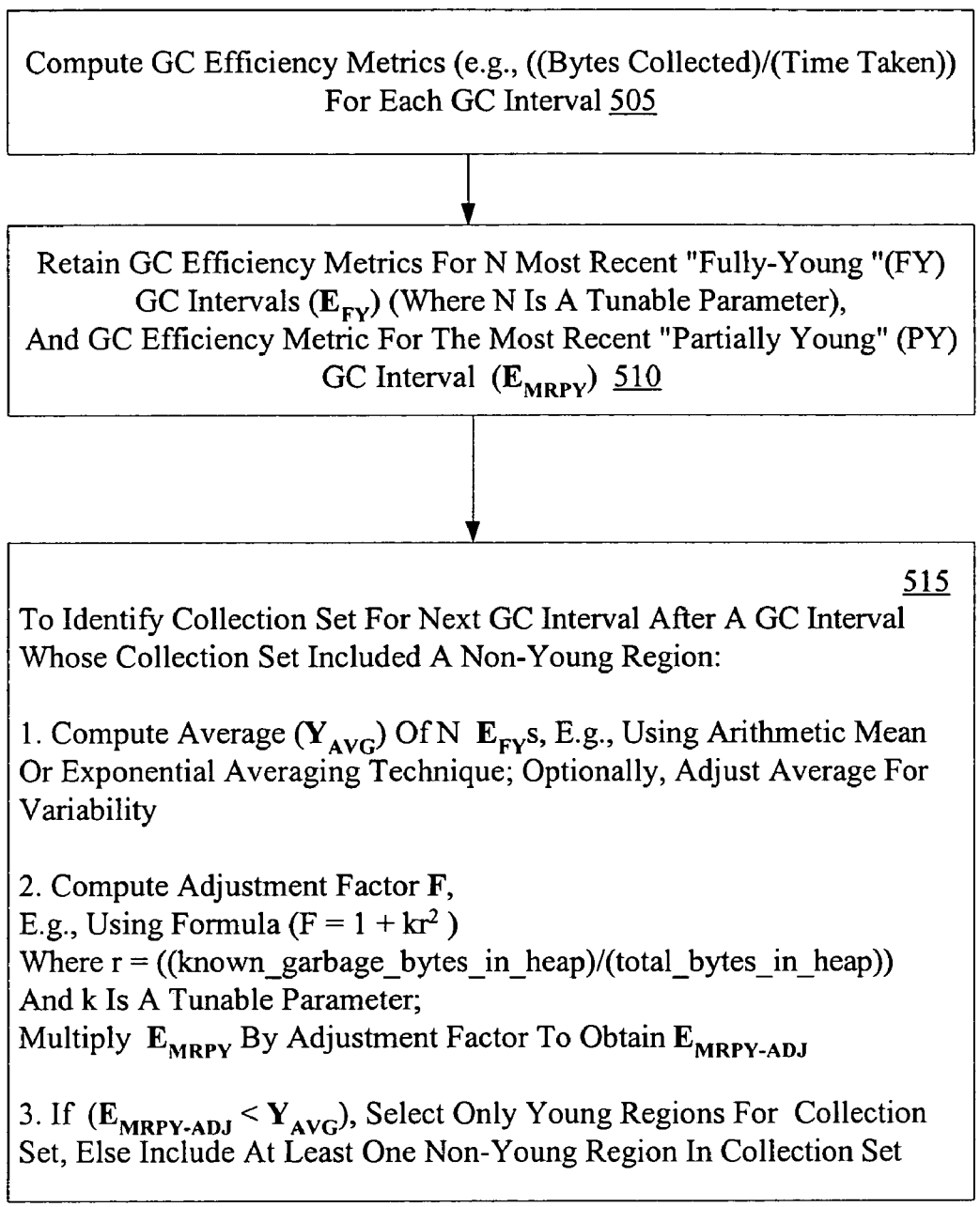
FIG. 5 is a flow diagram illustrating aspects of a garbage collector configured to utilize a heuristic that includes a computation of an average efficiency metric for a plurality of fully-young collection intervals in determining whether to exclude non-young regions from a collection set, according to one embodiment.

FIG. 5 is a flow diagram illustrating aspects of a garbage collector 120 configured to utilize a heuristic that includes a computation of an average GCE metric for a plurality of fully-young (FY) collection intervals in determining whether to exclude non-young regions from a collection set, according to one embodiment. As shown in block 505, garbage collector 120 may be configured to compute a GCE metric for each collection interval, e.g., by dividing the number of bytes of garbage collected in each collection interval by the elapsed time of the collection interval. The garbage collector 120 may be configured to retain the GCE metrics for each of the last "N" FY collection intervals, where N may be a configurable or tunable parameter (block 510), as well as the GCE metric for the most recent partially young (PY) collection interval. The GCE metrics for the FY intervals may be termed $E_{FY}$, and the GCE metric for the most recent PY collection interval may be termed $E_{MRPY}$. It is noted that not all of the N fully young intervals may be contiguous in the time sequence of collection intervals performed on heap 120 in some embodiments—e.g., the time sequence may include PY intervals between two or more pairs of the last N FY intervals.

To determine whether to exclude non-young regions from a collection set for a collection interval that follows a PY interval, garbage collector 120 may be configured to perform a series of operations illustrated in block 515 of FIG. 5. First, garbage collector 120 may be configured to compute an average value $Y_{AVG}$ of the retained fully young GCE metrics $E_{FY}$. The average value $Y_{AVG}$ may be computed using any desired averaging method in different implementations. For example, in one implementation, $Y_{AVG}$ may simply be computed as the arithmetic mean of the N saved $E_{FY}$ metrics. However, using an arithmetic mean may have the undesirable property that all $E_{FY}$ metrics computed prior to the last N $E_{FY}$ metrics may be ignored in the average value. In order to discount earlier GCE metrics in a more gradual fashion—for example, to give the most recent $E_{FY}$ metric a little more weight than second most recent, the second most recent $E_{FY}$ value a little more weight than the third most recent, and so on, a weighted exponential moving average may be computed instead. In such a technique, the average value $Y_{AVG}(t)$ at time t corresponding to a particular FY interval (FY-latest) may be computed using a formula such as:

$$Y_{AVG}(t) = (1-a) * E_{FY\text{-}latest} + a * (Y_{AVG}(t-1)),$$

where a is a "smoothing constant" (usually referred to as "alpha") between 0 and 1, $E_{FY\text{-}latest}$ is the GCE metric for the latest FY interval, and $Y_{AVG}(t-1)$ is the average value as computed for the immediately previous FY collection interval. It is noted that in embodiments where an exponential averaging technique is employed, it may not be necessary to retain the last N values of the metrics being averaged. Other averaging techniques may be used in other embodiments.

In some embodiments, garbage collector 120 may be configured to simply compare the value of $E_{MRPY}$ to $Y_{AVG}$, and to exclude non-young regions from the next collection set if $E_{MRPY}$ is less than $Y_{AVG}$. In one embodiment, $Y_{AVG}$ may be adjusted for variability in the efficiency of fully young collection intervals using a multiple of the standard deviation of the efficiency metrics. For example, in one implementation, $Y_{AVG}$ may be adjusted as follows before it is compared with $E_{MRPY}$:

$$\text{adjusted } Y_{AVG} = Y_{AVG} c * Y_{SD}$$

where c is a confidence factor and $Y_{SD}$ is the standard deviation of the GCE metrics for the fully young intervals. To increase the confidence level desired in the heuristic's results, for example, higher values of c may be used in adjusting $Y_{AVG}$. (It is noted that in the remainder of the description below, the term $Y_{AVG}$ may be deemed to represent either an unadjusted value of $Y_{AVG}$, or a value of $Y_{AVG}$ adjusted for variability as described above.) In embodiments where non-young regions are collected in order of decreasing estimated GCE, the condition that $E_{MRPY}$ is less than $Y_{AVG}$ may suggest that any additional PY collection intervals are not likely to be as efficient as FY intervals, so there may not be much benefit to including non-young regions in the next collection set. However, making the determination of excluding non-young regions purely on the basis of the comparison of $E_{MRPY}$ to $Y_{AVG}$ may not take into account the degree to which garbage has accumulated in the heap considered as a whole. Under some circumstances, e.g., if much of the heap comprises garbage, it may be advisable to continue collecting non-young regions even if the efficiency of such collections is not very high. If non-young regions are excluded from collection sets strictly on the basis of GCE, and the heap consists mostly of garbage, long collection intervals may eventually be required, which may prevent garbage collector 120 from meeting its soft real time goals. Accordingly, in one embodiment, garbage collector 120 may be configured to compute an adjustment factor that takes into account the fraction of the heap that is occupied by garbage, and apply this adjustment factor to $E_{MRPY}$ in the comparison with $Y_{AVG}$, as described below.

As shown in step 2 illustrated in block 515 of FIG. 5, an adjustment factor F may be computed in one embodiment using a formula such as $F = (1 + kr^2)$, where k may be a tunable or configurable positive number, and r is an estimate of the fraction of the heap that consists of garbage or unreachable objects. In some embodiments, as described earlier, the marking cycle performed by garbage collector 120 may include a calculation of how much space in the heap is live or reachable. The amount of space on the heap that consists of unreachable or garbage objects may then be obtained by subtracting the total live space from the size of the heap. The value of r may then be obtained using the formula r = (known garbage bytes in heap)/(size of heap in bytes). It is noted that in some embodiments, where for example the marking cycle is performed incrementally, the estimate of live space provided by the marking cycle may be a conservative upper bound on the actual live space (e.g., since some of the objects identified as live may have become unreachable since the amount of live space was estimated), and therefore the estimate of garbage space (as well as r) may be a conservative lower bound. Since the value of r lies between 0 and 1 (because the heap has to be at least 0% garbage and can at most be 100% garbage), and k is a positive number, the value of F must lie between 1 and (k+1) and must increase as r (or the proportion of known garbage in the heap) increases. It is noted that in some embodiments, r may be derived using a technique other than a calculation of live space performed during a marking phase.

Garbage collector 120 may be configured to multiply $E_{MRPY}$ by F to obtain an adjusted quantity $E_{MRPY\text{-}ADJ}$. $E_{MRPY\text{-}ADJ}$ takes both the efficiency of the last PY collection interval ($E_{MRPY}$) and the estimated proportion of the heap that is garbage (r) into account, and increases when either $E_{MRPY}$ or r increases. Garbage collector 120 may then be configured to determine that the next collection set is to exclude non-young regions only if the adjusted quantity $E_{MRPY\text{-}ADJ}$ is less than $Y_{AVG}$. By adjusting $E_{MRPY}$ as shown in block 515 of FIG. 5, garbage collector 120 may ensure that the total amount of garbage in the heap influences the decision to revert to PY intervals, and that the decision is not made based on efficiency considerations alone. It is noted that any suitable adjustment factor F that takes the total amount of garbage in the heap into account may be used in different embodiments, i.e., a formula other than $F=(1+kr^2)$ may be used in some embodiments. It is also noted that, in the embodiment illustrated in FIG. 5, the adjustment factor does not simply take into account the amount of space that is in use in the heap (much of which could be live), but instead specifically takes into account the amount of garbage in the heap 140, and tends to increase the likelihood of a PY interval being scheduled next as the relative proportion of garbage in the heap increases. Thus, when the use of the adjustment factor results in a PY interval being scheduled next, reclaimable or garbage objects are more likely to be found in the non-young region or regions selected for the PY collection set than if the adjustment factor were not used.

In the embodiment illustrated in FIG. 5, the heuristic includes a comparison of a GCE metric of the most recent PY collection (possibly adjusted using a factor derived from r) with an average value of the GCE metrics of a set of FY collections. In another embodiment, instead of using the GCE metric of the most recent PY collection, the heuristic may comprise a comparison of an estimated GCE metric for a next PY collection with the average value of the GCE metrics for the set of FY collections. As noted above, in some embodiments the garbage collector 120 may be configured to rank the non-young regions 141 (e.g., as part of a marking cycle or at the end of a marking cycle) in order of estimated GCE. The estimated GCE of uncollected non-young regions may be used in the heuristic to determine an estimated GCE metric $E_{PY\text{-}NEXT}$, and $E_{PY\text{-}NEXT}$ may be used in place of $E_{MRPY}$ in heuristic computations similar to those illustrated in FIG. 5 in some embodiments. In such embodiments, the decision as to whether to exclude non-young regions from the next collection set would therefore be made based on an estimate of efficiency of a future PY interval, rather than based on the efficiency of a prior PY interval as illustrated in FIG. 5.

It is noted that while in the embodiments described above in conjunction with the description of FIG. 2a-2e, garbage collector 120 is configured to evacuate or copy live objects 160 across regions 141 during collection intervals, heuristic techniques such as those described above to exclude one or more categories of heap regions from a collection set may also be used by garbage collectors that do not evacuate objects (such as compacting garbage collectors, for example) in some embodiments. In addition, various features of garbage collector 120, e.g., the specific manner in which soft real-time goals may be specified, the manner in which collection intervals are scheduled in response to soft real-time goals (e.g., how the garbage collector decides on a desirable duration of a specific collection interval), etc., may be implemented using a variety of techniques in different embodiments. For example, in one embodiment garbage collector 120 may be configured to utilize various aspects of a technique known in the literature as Generational Garbage-First collection to implement some of these features. Heuristic techniques to determine collection sets such as those described above may also be used in embodiments where real-time constraints are not specified, e.g., where much more emphasis is placed on throughput than on responsiveness. A variety of different garbage collector efficiency metrics may be used in different embodiments—that is, a definition of garbage collection efficiency other than (bytes collected)/(time taken), such as (bytes collected)/(bytes examined) may be used in some embodiments. The values of various tunable parameters used by garbage collector 120 (such as "N" and "k" in FIG. 5, or the definition of "high occupancy level" that triggers a marking cycle) may be modified as needed in various embodiments. For example, in one embodiment, garbage collector 120 and/or mutator 110 may be configured to keep track of how well the mutator's soft real-time goals are being met over time. One or more of the tunable values may be changed (either automatically or in response to administrator input) in response to observed trends in the effectiveness of the garbage collector in meeting the goals. If the trends indicate, for example, that the garbage collector is switching too quickly to FY intervals after a sequence of PY intervals, k may be increased to make it more likely that non-young regions are collected sooner.

In various embodiments, processors 101 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of garbage collector 120 and/or mutator 110 may be partly or fully resident within a memory 102 at a given point in time, and may also be stored on a storage device (not shown in FIG. 1). In various embodiments, mutator 110 may be any type of individual or standalone application (e.g., a database application or a scientific simulation application), an instance or component of a distributed application, an application server configured to support a collection of deployed applications including J2EE™ (Java 2 Enterprise Edition) applications, etc. Memory 102 may be implemented using any appropriate medium such as any of various types of RAM (e.g., DRAM, SDRAM, RDRAM, SRAM, etc.). In addition to processors 101 and memory 102, system 100 may also include one or more I/O interfaces providing access to storage devices, one or more network interfaces providing access to a network and the like. Any of a variety of storage devices may be used to store the instructions as well as data for mutator 110 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   using a computer to perform:
   allocating memory to objects within one or more regions of a heap partitioned into a plurality of regions;
   classifying each region of the one or more regions as belonging to a category of regions of a plurality of categories, based at least in part on a recency of allocation of an object within the region;
   determining whether regions belonging to a first category of the plurality of categories are to be excluded from a collection set of one or more regions from which memory is to be reclaimed during a particular garbage collection interval on the heap, wherein said determining is based on an efficiency metric of garbage collection during a garbage collection interval on the heap, wherein the efficiency metric is calculated based upon an amount of memory reclaimed during a previous garbage collection interval having a collection set including a region belonging to the first category; and in response to determining that the collection set is to exclude regions belonging to the first category, reclaiming memory from one or more regions that do not belong to the first category during the particular garbage collection interval.

2. The computer-implemented method as recited in claim 1, wherein the particular garbage collection interval follows an other garbage collection interval in a sequence of garbage collection intervals performed on the heap, wherein the collection set of the other garbage collection interval comprises a region belonging to the first category.

3. The computer-implemented method as recited in claim 1, wherein said determining is based on a heuristic derived at least in part from the efficiency metric and at least in part from an estimate of a fraction of the heap that comprises unreachable objects.

4. The computer-implemented method as recited in claim 1, wherein the plurality of categories comprises a second category, wherein the first category of regions comprises non-young regions and the second category of regions comprises young regions.

5. The computer-implemented method as recited in claim 1, wherein said determining is based at least in part on a first efficiency metric of garbage collection during a first garbage collection interval and a second efficiency metric of garbage collection during a second garbage collection interval, wherein a first collection set corresponding to the first garbage collection interval includes a region belonging to the first category, and a second collection set corresponding to the second garbage collection set excluded regions belonging to the first category.

6. The computer-implemented method as recited in claim 1, wherein the efficiency metric is computed by dividing the amount of memory reclaimed during the garbage collection interval by the time taken to complete the garbage collection interval.

7. The computer-implemented method as recited in claim 1, wherein said determining is based on a heuristic derived from a plurality of efficiency metrics, wherein each efficiency metric of the plurality of efficiency metrics is computed for a respective garbage collection interval of a sequence of previous garbage collection intervals performed on the heap, wherein each efficiency metric is computed by dividing the amount of memory reclaimed during the respective garbage collection interval by the time taken to complete the respective garbage collection interval, and wherein the heuristic comprises:

computing an average value of the plurality of metrics of the sequence of previous garbage collection intervals.

8. The computer-implemented method as recited in claim 7, wherein the heuristic further comprises:

comparing the average value with an additional efficiency metric of garbage collection; and determining that the collection set is to exclude regions belonging to the first category if the value of the additional efficiency metric is less than the average value.

9. The computer-implemented method as recited in claim 8, wherein the additional efficiency metric is computed for a previous garbage collection interval on the heap not included in the sequence, wherein the collection set of the previous garbage collection interval not included in the sequence comprised a region belonging to the first category.

10. The computer-implemented method as recited in claim 8, wherein the additional efficiency metric is a predicted efficiency metric for the particular garbage collection interval.

11. The computer-implemented method as recited in claim 8, further comprising:

deriving the additional efficiency metric, wherein said deriving comprises:

computing an adjustment factor derived from an estimate of a size of a fraction of the heap that comprises unreachable objects; and multiplying the adjustment factor with an efficiency metric for an other collection interval on the heap to obtain the additional efficiency metric, wherein the collection set for the other collection interval comprises a region belonging to the first category.

12. The computer-implemented method as recited in claim 7, wherein the sequence of previous garbage collection intervals excludes any garbage collection interval whose collection set comprised a region belonging to the first category.

13. A system, comprising:

a processor; and memory coupled to the processor, wherein the memory stores program instructions executable by the processor to:

allocate memory to objects within one or more regions of a heap partitioned into a plurality of regions;

classify each region of the one or more regions as belonging to a category of regions of a plurality of categories, based at least in part on a recency of allocation of an object within the region;

determine whether regions belonging to a first category of the plurality of categories are to be excluded from a collection set of one or more regions from which memory is to be reclaimed during a particular garbage collection interval on the heap, wherein said determining is based on an efficiency metric of garbage collection during a garbage collection interval on the heap, wherein the efficiency metric is calculated based upon an amount of memory reclaimed during a previous garbage collection interval having a collection set including a region belonging to the first category; and in response to determining that the collection set is to exclude regions belonging to the first category, reclaim memory from one or more regions that do not belong to the first category during the particular garbage collection interval.

14. The system as recited in claim 13, wherein said determining is based on a heuristic derived at least in part from the efficiency metric and at least in part from an estimate of a fraction of the heap that comprises unreachable objects.

15. The system as recited in claim 13, wherein said determining is based on a heuristic derived from a plurality of efficiency metrics, wherein each efficiency metric of the plurality of efficiency metrics is computed for a respective garbage collection interval of a sequence of previous garbage collection intervals performed on the heap, wherein each efficiency metric is computed by dividing the amount of memory reclaimed during the respective garbage collection interval by the time taken to complete the respective garbage collection interval, and wherein the heuristic comprises:

computing an average value of the plurality of metrics of the sequence of previous garbage collection intervals.

16. The system as recited in claim 13, wherein the heuristic further comprises:
   comparing the average value with an additional efficiency metric of garbage collection, wherein the additional efficiency metric is computed for an other collection interval on the heap, wherein the collection set for the other collection interval comprises a region belonging to the first category; and
   determining that the collection set is to exclude regions belonging to the first category if the value of the additional efficiency metric is less than the average value.

17. A computer readable medium, comprising program instructions, wherein the program instructions are computer-executable to:
   allocate memory to objects within one or more regions of a heap partitioned into a plurality of regions;
   classify each region of the one or more regions as belonging to a category of regions of a plurality of categories, based at least in part on a recency of allocation of an object within the region;
   determine whether regions belonging to a first category of the plurality of categories are to be excluded from a collection set of one or more regions from which memory is to be reclaimed during a particular garbage collection interval on the heap, wherein said determining is based on an efficiency metric of garbage collection during a garbage collection interval on the heap, wherein the efficiency metric is calculated based upon an amount of memory reclaimed during a previous garbage collection interval having a collection set including a region belonging to the first category; and
   in response to determining that the collection set is to exclude regions belonging to the first category, reclaim memory from one or more regions that do not belong to the first category during the particular garbage collection interval.

18. The computer readable medium as recited in claim 17, wherein said determining is based on a heuristic derived at least in part from the efficiency metric and at least in part from an estimate of a fraction of the heap that comprises unreachable objects.

19. The computer readable medium as recited in claim 17, wherein said determining is based on a heuristic derived from a plurality of efficiency metrics, wherein each efficiency metric of the plurality of efficiency metrics is computed for a respective garbage collection interval of a sequence of previous garbage collection intervals performed on the heap, wherein each efficiency metric is computed by dividing the amount of memory reclaimed during the respective garbage collection interval by the time taken to complete the respective garbage collection interval, and wherein the heuristic comprises:
   computing an average value of the plurality of metrics of the sequence of previous garbage collection intervals.

20. The computer readable medium as recited in claim 17, wherein the heuristic further comprises:
   comparing the average value with an additional efficiency metric of garbage collection, wherein the additional efficiency metric is computed for an other collection interval on the heap, wherein the collection set for the other collection interval comprises a region belonging to the first category; and
   determining that the collection set is to exclude regions belonging to the first category if the value of the additional efficiency metric is less than the average value.

* * * * *